Patented June 10, 1930

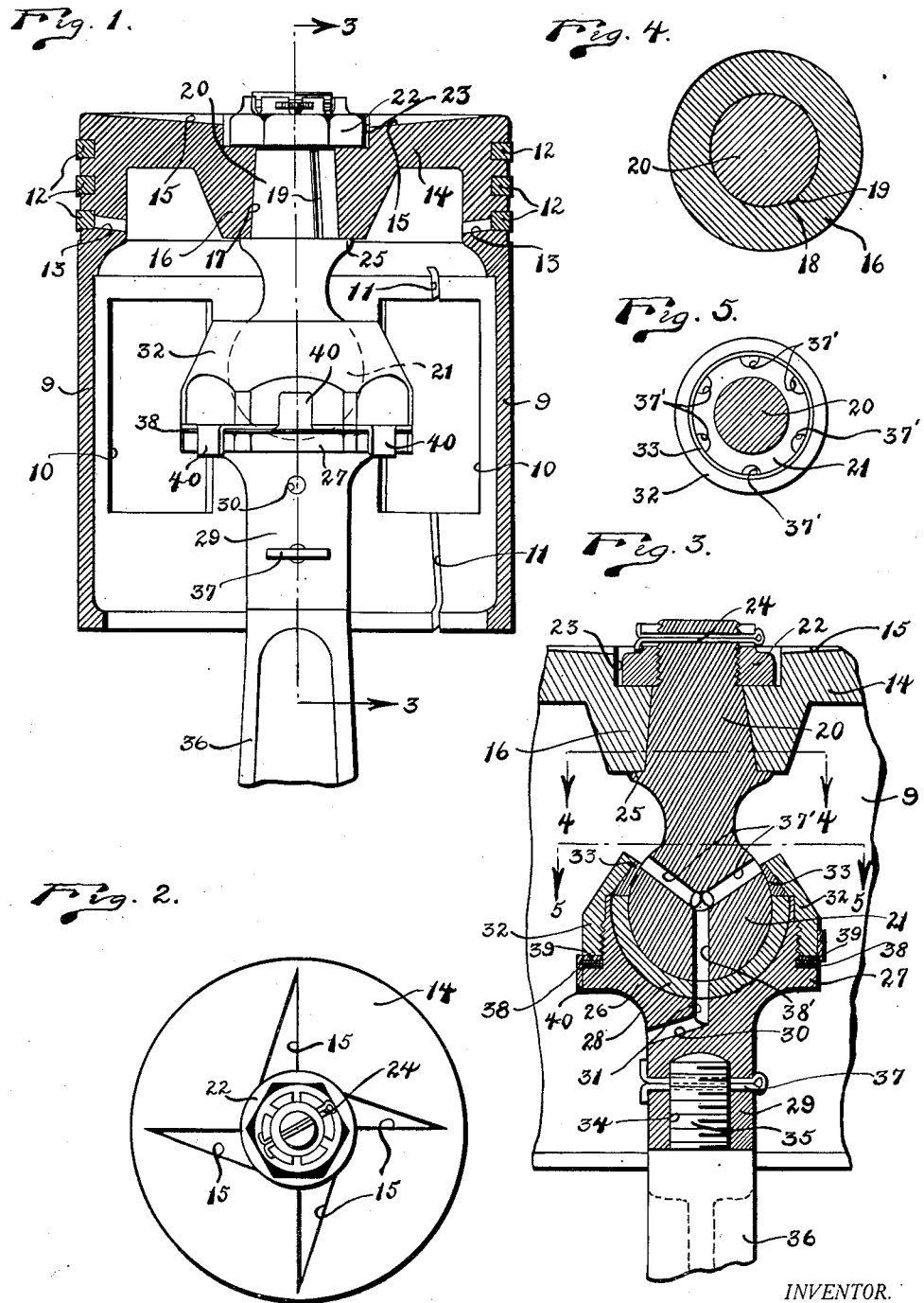

1,762,541

UNITED STATES PATENT OFFICE

WILLIAM R. BLOWERS, OF DETROIT, MICHIGAN

PISTON

Application filed November 11, 1927. Serial No. 232,528.

My invention relates to a new and useful improvement in a piston, and particularly the mechanism for connecting the piston to the connecting rod.

It is an object of the present invention to provide a connection whereby the piston will be free to rotate on the connecting rod, and also free to rock thereon.

I am aware that there have been various devices originated for connecting the piston to the connecting rod so that the piston might be self-aligning, and thus relieve the walls of the cylinder of undue strain and wear; but in the present invention there is provided a universal movement.

It is another object of the invention to provide a connection of this class which will be simple in structure, economical of manufacture and highly efficient in use.

Another object of the invention is the provision of a connection of this class which will permit of adjustments to compensate for the wear which may result either on the ball or the socket which serves to make the connection.

Another object of the invention is the provision of a ball and socket connection having a simple and effective system of lubrication.

Another object of the invention is the provision of a connection on the piston which will be firm and secure, non-rotatable on the piston itself, and one which will be easily and quickly removed when it is desired to remove the piston from the cylinder.

Other objects will appear hereinafter.

The invention consists in the combination and arrangement of parts hereinafter described and claimed.

The invention will be best understood by a reference to the accompanying drawings which form a part of this specification and in which, Fig. 1 is a central, vertical, sectional view of a piston showing the invention applied.

Fig. 2 is a top plan view of a piston embodying the invention.

Fig. 3 is a central sectional view of the connection showing the piston in fragment, taken on line 3—3 of Fig. 1.

Fig. 4 is a sectional view taken on line 4—4 of Fig. 3.

Fig. 5 is a sectional view taken on line 5—5 of Fig. 3.

In the drawings I have illustrated the piston provided with a skirt 9 having a plurality of openings or windows 10 formed therein for the purposes of reducing the weight of the piston to the minimum. An axially extending slit 11 is formed in the skirt extending well upwardly beyond the openings 10 so that the skirt may be free for expansion and contraction, the slit 11 providing the necessary space for taking up the movement incident to expansion and contraction. In the head of the piston are provided the customary piston rings 12 lubricating the openngs 13 extending inwardly to the center of the piston from the lowermost ring groove.

As shown in Fig. 1 and in Fig. 2, the head 14 is formed with a plurality of recesses 15 which taper in width toward the periphery of the head 14 and also taper in depth. Extending inwardly of the head 14 is a collar or boss 16 having a tapered bore 17 formed therein, in which is formed the axially extending groove 18 to accommodate the axially extending peripheral rib 19 which is on the tapered neck or piston connecting member 20, which extends from the ball 21. The neck 20, adjacent its end, is threaded for the reception of a castellated nut 22 threaded thereon and adapted to seat in the recess 23 formed in the head 14, a suitable cotter pin 24 being projected through the neck 20. A shoulder 25 is adapted to engage the inner end of the sleeve or boss 16. The engagement of the rib 19 in the groove 18 prevents a relative rotation of the piston in the neck 20. A bearing 26 is provided, this bearing having its periphery threaded and provided with a flange 27. A lining 28 made from brass, babbitt, or other suitable metal, is positioned in the bearing 26.

As shown clearly in Fig. 3, a neck 29 extends from the bearing 26 and is provided with an angularly extending passage 30 which communicates through the passage 31 with the inner surface of the bearing, this passage 31 extending through the lining 28.

In operation, the neck 20 is secured to the piston, as shown in Fig. 3, and the ball 21 placed in engagement with the bearing 26, a nut 32 being first positioned in embracing relation on the neck. This nut 32 is adapted for threading on the bearing 26, and forming with this bearing a socket in which the ball 21 is secured, a lining 33 being formed on the inner surface of the nut 32, this lining 33 being made from babbitt, brass, or other suitable metal. The neck 29 is provided with the interiorly threaded socket 34 in which engages the reduced threaded portion 35 of the connecting rod 36, a cotter pin 37 being extended through the neck 29 and the reduced portion 35. Positioned between the edge of the nut 32 and the upper surface of the flange 27 are a plurality of thin washers 38 which serve as shims. There is also positioned between the nut 32 and the flange 27 the locking washer 39 having a plurality of tongues 40 projecting radially outwardly therefrom, a portion of these tongues being adapted for turning upwardly as shown in Fig. 1, to engage the flat sides of the nut 32, and a portion being adapted for turning downwardly, as shown in Fig. 1, to engage the flat sides on the flange 27, so that the nut 32 is locked against rotation relatively to the bearing 26.

Formed in the ball 21 are a plurality of radially extending passages 37' which communicate with a passage 38' adapted to be brought into registration with the passage 31, these passages 37', 38', 31 and 30 serving as a means for lubricating the bearing, the lubrication entering through the passages 37' and flowing through the passage 38'. It is believed evident that as the connecting rod 36 is moved out of axial alignment with the piston, the passage 38' will be moved out of registration with the passage 31 and the bearing lining 28 will be lubricated.

By forming the recesses 15 on the top of the head 14 as shown, a rotation of the piston while in operation is effected, the explosion delivering a thrust to the cylinder at the deep walls of the recesses 15, and thus tending to rotate and effecting a rotation of the piston on its mountings, the ball 21 rotating in the socket formed by the bearing 26 and the nut 32.

With a piston constructed and mounted in this manner provision has been made for expansion and contraction, and on account of the rotating and oscillating movement of the piston relatively to its mountings, a scoring of the cylinder is obviated, and the friction resulting from excessive strain on the walls of the cylinder at predetermined points is prevented. The piston slap is also eliminated so that the walls of the cylinder and the piston bearing surface are maintained in perfect condition at all times, thus reducing to a considerable extent the labor necessary to service the piston.

It is believed evident that a more perfectly balanced piston in comparison with the wrist pin mounted piston is obtained by the present invention. Furthermore, on account of the recesses in the head, there is provided a space for carbon deposits which may accrue from time to time, and consequently, the knocking resulting from accumulation of carbon in the ordinary piston and cylinder arrangement is prevented.

It is also believed evident that the interior parts of the piston are facilitated by such a structure as a removal of the head may be easily and quickly effected, thus reducing considerably the labor required for adjustments, etc.

Should the lining of the socket become worn or the ball 21 itself become worn for any reason, the piston may be easily and quickly removed, the nut unthreaded, and one or more of the shim washers 38 removed, so that the nut 32 may again be threaded down tightly to take up the wear which has occurred.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A device of the class described adapted for use with a piston having a bore formed therein, comprising: a piston connecting member insertable into said bore; a head carried by said connecting member; a socket comprising a pair of sections, one of said sections being threaded on the other; a washer positioned between said sections; a plurality of tongues projecting outwardly from the periphery of said washer and adapted for being bent into engagement with said sections and preventing relative rotation thereof.

In testimony whereof I have signed the foregoing specification.

WILLIAM R. BLOWERS.